(12) United States Patent
Matsumoto et al.

(10) Patent No.: US 7,633,500 B2
(45) Date of Patent: Dec. 15, 2009

(54) PLOTTING METHOD, PLOTTING PROGRAM, AND PLOTTING EQUIPMENT

(75) Inventors: Reiji Matsumoto, Saitama (JP); Hajime Adachi, Saitama (JP); Shunichi Kumagai, Saitama (JP); Takuya Hirose, Saitama (JP); Masayoshi Suzuki, Saitama (JP)

(73) Assignees: Pioneer Corporation, Tokyo (JP); Pioneer System Technologies Corporation, Sendai-shi (JP)

( * ) Notice: Subject to any disclaimer, the term of this patent is extended or adjusted under 35 U.S.C. 154(b) by 593 days.

(21) Appl. No.: 10/594,320

(22) PCT Filed: Mar. 15, 2005

(86) PCT No.: PCT/JP2005/004492

§ 371 (c)(1),
(2), (4) Date: Oct. 30, 2006

(87) PCT Pub. No.: WO2005/098760

PCT Pub. Date: Oct. 20, 2005

(65) Prior Publication Data

US 2007/0176928 A1 Aug. 2, 2007

(30) Foreign Application Priority Data

Mar. 31, 2004 (JP) ............................. 2004-108249

(51) Int. Cl.
*G06T 15/00* (2006.01)
*G09G 5/36* (2006.01)
(52) U.S. Cl. ..................................... 345/419; 345/592
(58) Field of Classification Search ................ 345/419, 345/592
See application file for complete search history.

(56) References Cited

FOREIGN PATENT DOCUMENTS

| JP | 9-70481 A | 3/1997 |
|---|---|---|
| JP | 9-138136 A | 5/1997 |
| JP | 9-161096 A | 6/1997 |
| JP | 11-259685 A | 9/1999 |
| JP | 2002-222431 A | 8/2002 |
| JP | 2003-216967 A | 7/2003 |

*Primary Examiner*—Ulka Chauhan
*Assistant Examiner*—Jeffrey J Chow
(74) *Attorney, Agent, or Firm*—Foley & Lardner LLP

(57) ABSTRACT

A ground object is arranged so that it overlaps with a cylindrical object. Inside the cylindrical object, foot data of the ground object is arranged. Since the foot data on the side of a fore-end opening is positioned behind a fore-end face object with respect to view point coordinates, hidden surface removal is carried out for an image of the foot data on the side of the fore-end opening viewed from the view point coordinates by a Z value of a transparent drawn image of the fore-end face object.

15 Claims, 9 Drawing Sheets

PLOTTING METHOD, PLOTTING PROGRAM, AND PLOTTING EQUIPMENT

TECHNICAL FIELD

The present invention relates to a drawing method, a drawing program, and a drawing apparatus. However, applications of the present invention are not limited to the drawing method, the drawing program, and the drawing apparatus stated above.

BACKGROUND ART

Conventionally, there has been disclosed a map retrieving device that can express a map in three dimensions by processing with a small calculation load. This map retrieving device reads out map data of area near the current position of a vehicle calculated by a position calculating device, or map data of the map to be displayed in a range specified with an input device, from a map storage device. Subsequently, a processing unit carries out transparent transformation of four peaks of the read map data based on a view point and fixation point coordinates input from the input device, maps the map data on the transformed coordinates, and clips the data, to display the map after mapping in an output device (see Patent Document 1 below).

Patent Document 1: Japanese Patent Laid-Open Publication No. H09-138136

DISCLOSURE OF INVENTION

Problem to be Solved by the Invention

However, in the conventional technology of Patent Document 1 mentioned above, only a bird's eye view has been drawn using a ground object expressing ups and downs of the ground, and the interior of a tunnel formed inside the ground has not been drawn. For this reason, when the ground object in which the tunnel as mentioned above is not formed is drawn from a view point of a driver, a drawn image would be such that a road collides with the ground. Hence, the front scenery that the driver actually views and the drawn image differ from each other, so that there is a problem with respect to safe driving that, for example, it gives the driver uneasiness and misunderstanding.

Meanwhile, if tunnel data is originally established in the ground object, the amount of data becomes huge, leading to a problem that, for example, a large-capacity memory would be required and the device would become expensive.

Means for Solving Problem

A drawing method according to the invention of claim 1 includes an inputting step of inputting arbitrary view point coordinates in a three-dimensional coordinate system; a first drawing step of drawing an image of one object when the one object is viewed from the view point coordinates input at the inputting step, the one object generated based on road network data using a two-dimensional coordinate system; a modifying step of modifying depth information of the image of the one object drawn at the first drawing step to information on distance from a position closer to the view point coordinates than the one object to the view point coordinates; and a second drawing step of drawing, based on the depth information modified at the modifying step, an image of a ground object other than the one object when the ground object is viewed from the view point coordinates so as to overlap with the image of the one object, the ground object expressed using the three-dimensional coordinate system.

Moreover, a drawing program according to the invention of claim 7 makes a computer execute the drawing method according to any one of claims 1 to 5.

Furthermore, a drawing apparatus according to the invention of claim 8 includes an input unit that inputs arbitrary view point coordinates in a three-dimensional coordinate system; a first drawing unit that draws an image of one object when viewed from the view point coordinates input by the input unit, the one object generated based on road network data using a two-dimensional coordinate system; a modifying unit that modifies depth information of the image of the one object drawn by the first drawing unit to information on distance from a position closer to the view point coordinates than the one object to the view point coordinates; and a second drawing unit that draws, based on the depth information modified by the modifying unit, an image of a ground object other than the one object when the ground object is viewed from the view point coordinates so as to overlap with the image of the one object, the ground object expressed using the three-dimensional coordinate system.

EXPLANATIONS OF LETTERS OR NUMERALS

Figure 1:
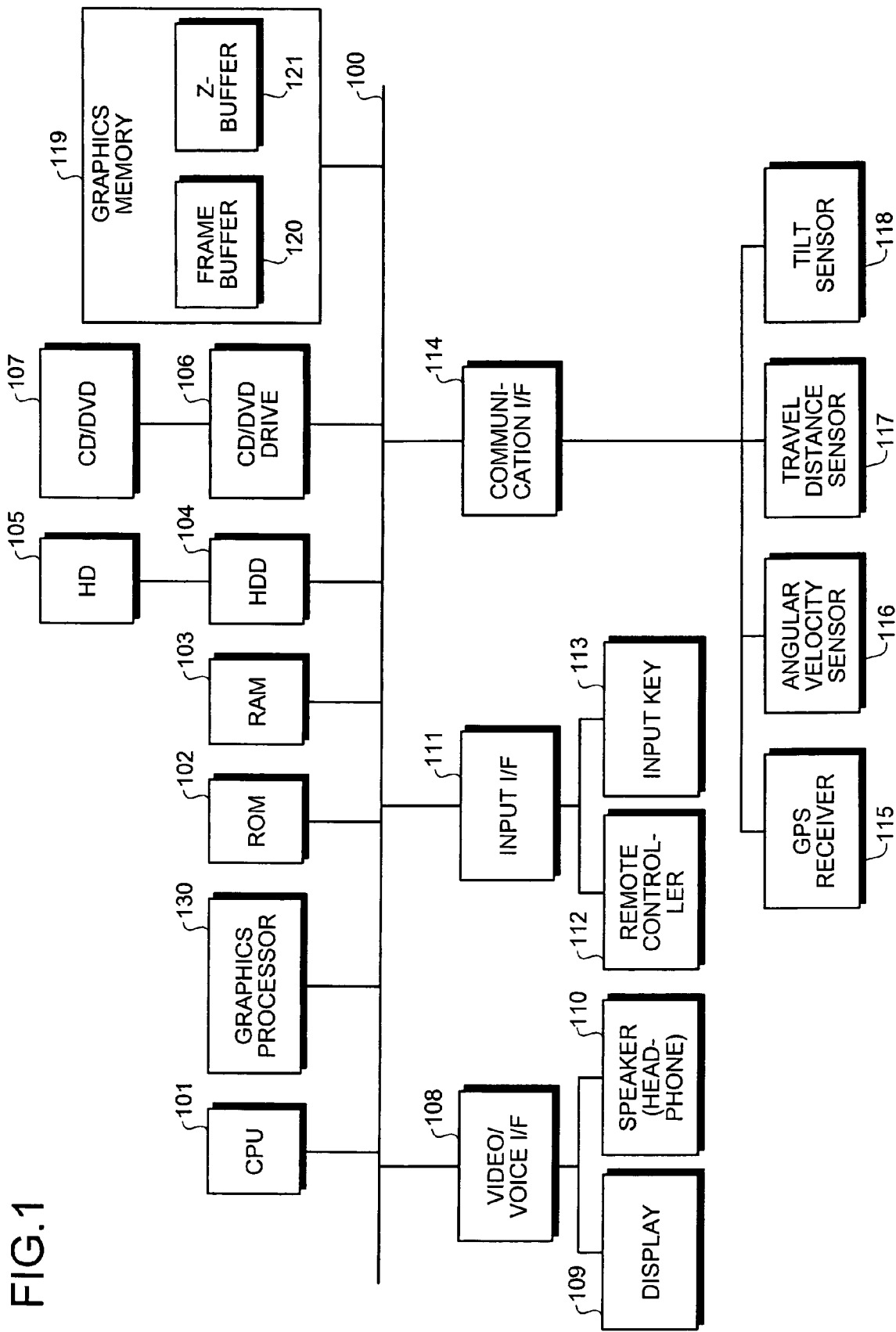
FIG. 1 is a block diagram of a hardware configuration of a drawing apparatus according to an embodiment of the present invention.

200 drawing apparatus
201 map information database
202 storage unit
203 input unit
204 extracting unit
205 generating unit
206 drawing unit
207 modifying unit 208 detecting unit
400 cylindrical object

BEST MODE(S) FOR CARRYING OUT THE INVENTION

Exemplary embodiments of a drawing method, a drawing program, and a drawing apparatus according to embodiments of the present invention will be explained in detail below with reference to the accompanying drawings. It is an object of the drawing method, the drawing program, and the drawing apparatus according to the embodiments of the present invention to draw a simple and realistic image so as to achieve improvement in safe driving. Moreover, the drawing method, the drawing program, and the drawing apparatus according to the embodiments of the present invention are, for example, the drawing method, the drawing program, and the drawing apparatus using a Z-buffer method as an example of a hidden surface removal method.

EMBODIMENTS (Hardware Configuration of Drawing Apparatus)

First, a hardware configuration of the drawing apparatus according to the embodiment of the present invention will be explained. FIG. 1 is a block diagram of the hardware configuration of the drawing apparatus according to the embodiment of the present invention.

As shown in FIG. 1, the drawing apparatus includes a CPU 101, a ROM 102, a RAM 103, a HDD (hard disk drive) 104, a HD (hard disk) 105, a CD/DVD drive 106, a CD/DVD 107 as an example of a removable recording medium, an video/voice I/F (interface) 108, a display 109, a speaker (headphone) 110, an input I/F (interface) 111, a remote controller 112, an input key 113, a communication I/F (interface) 114, a GPS (Global Positioning System) receiver 115, an angular velocity sensor 116, a travel distance sensor 117, a tilt sensor 118, a graphics memory 119, and a graphics processor 130. The respective components 101 through 119, and 130 are connected through a bus 100 with each other.

The CPU 101 performs the overall control of the drawing apparatus. The ROM 102 stores a program such as a boot program. The RAM 103 is used as a work area of the CPU 101. The HDD 104 controls the reading/writing of data from/to the HD 105 in accordance with the control by the CPU 101. The HD 105 stores the data written in by control by the HDD 104.

The CD/DVD drive 106 controls the reading/writing of the data from/to the CD/DVD 107 in accordance with the control by the CPU 101. The CD/DVD 107 is the removable recording medium from which the recorded data is read out in accordance with the control by the CD/DVD drive 106. A writable recording medium can also be used as the CD/DVD 107. The removable recording medium may be, besides the CD/DVD 107, a CD-ROM (CD-R, CD-RW), an MO, a memory card, or the like.

The video/voice I/F 108 is connected to the display 109 for video displays the headphone (speaker) 110 for voice outputs. On the display 109, the various data including an icon, a cursor, a menu, a window, as well as a character and an image, is displayed. As this display 109, a CRT, a TFT liquid crystal display, a plasma display, or the like can be employed.

The Input I/F 111 inputs the data transmitted from the remote controller 112 or the input key (including a keyboard or a mouse) 113 provided with a plurality of keys for inputting a character, a numeric value, various instructions, etc.

Although not illustrated in the figures, an output I/F is provided, as necessary, and through the output I/F, a scanner that optically reads the character and the image, or a printer that prints the character and the image can be connected.

The communication I/F 114 is connected to a network wirelessly or through a communication cable, and functions as an interface between the network and the CPU 101. The network includes a LAN, a WAN, a public network, a portable telephone network, or the like. The communication I/F 114 inputs the various data output from the GPS receiver 115, the angular velocity sensor 116, the travel distance sensor 117, and the tilt sensor 118.

The GPS receiver 115 receives an electric wave from a GPS satellite to obtain a geometric location with respect to the GPS satellite, and the measurement can be carried out anywhere on the earth. As the electric wave, an L1 wave, which is a carrier wave of 1,575.42 MHz, containing a C/A (Coarse and Access) code and a navigation message is used. The C/A code has a bit rate of 1.023 Mbps, and the length of the code is 1023 bits=1 ms.

The navigation messages has a bit rate of 50 bps, and with regard to the length of the code, a sub-frame is 300 bits=6 s, a mainframe is 1500 bits=30 s, five sub-frames equal to one mainframe, and 25 mainframes equal to one master frame. That is, while receiving the electric wave from the GPS satellite to output GPS positioning data, the absolute direction data of the direction of movement of the vehicle itself is output.

The angular velocity sensor 116 detects an angular velocity when the vehicle itself turns, and outputs the angular velocity data and the relative direction data. The travel distance sensor 117 computes the number of pulses per one wheel rotation by counting the number of pulses of a pulse signal of a predetermined cycle output with the rotation of a wheel, and outputs the travel distance data based on the number of pulses per one rotation. The tilt sensor 118 detects the angle of gradient of a road surface, and outputs the tilt angle data.

The graphics memory 119 includes a frame buffer 120 and a Z-buffer 121. The frame buffer 120 stores the color data of the drawn image for every pixel. The Z-buffer 121 stores Z values representing the depth of the drawn image for every pixel. The graphics memory 119 may be configured by providing a region for graphics in the interior of the RAM 103 mentioned above. The graphics processor 130 manages graphic-related processing, for example, the control of drawing and displaying of the map information.

(Functional Configuration of Drawing Apparatus)

Figure 2:
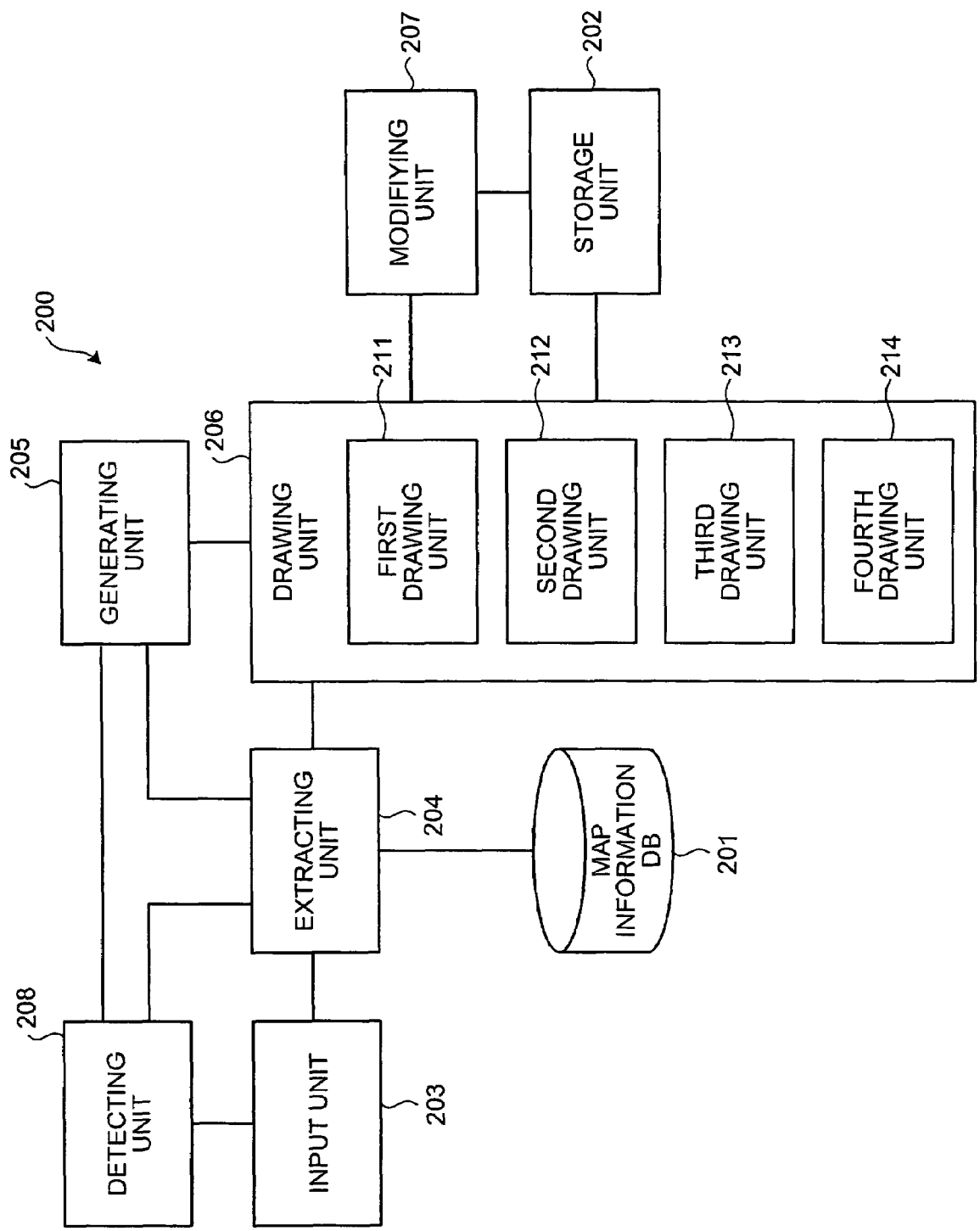
FIG. 2 is a functional diagram of a hardware configuration of a drawing apparatus according to an embodiment of the present invention.

Next, a functional configuration of the drawing apparatus according to the embodiment of the present invention will be explained. FIG. 2 is a block diagram illustrating the functional configuration of a drawing apparatus 200 according to the embodiment of the present invention. In FIG. 2, the drawing apparatus 200 is provided with a map information database 201, an input unit 203, an extracting unit 204, a generating unit 205, a drawing unit 206, a modifying unit 207, a storage unit 202, and a detecting unit 208.

Figure 3:
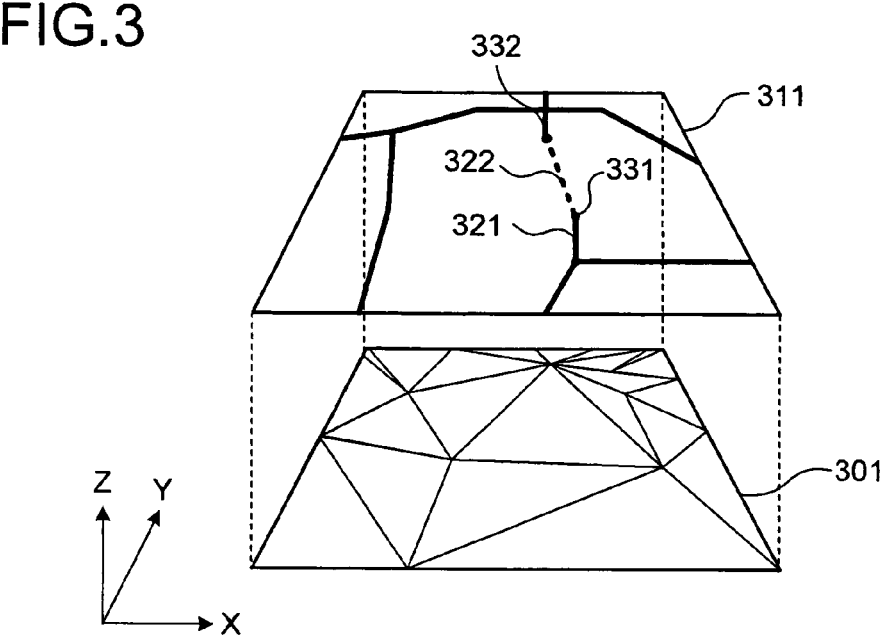
FIG. 3 is a diagram schematically illustrating information stored in a map information database illustrated in FIG. 2.

The map information database 201 stores the map information. FIG. 3 is a diagram schematically illustrating the information stored in the map information database 201 illustrated in FIG. 2. As shown in FIG. 3, the map information database 201 stores a ground object 301 that expresses ups-and-downs geometry of the ground in three dimensions using a three-dimensional coordinate system constituted by the X-axis, the Y-axis, and the Z-axis. The ground object 301 is specifically mesh data in which a plurality of polygons in the shape of triangle are combined, for example, and each peak of the polygon has a coordinate value using the 3D coordinate system.

In the map information database 201, road network data 311 that uses a two-dimensional coordinate system of these X-axis and Y-axis is stored as well. Specifically, the road network data 311 is the data in which a plurality of links are combined by nodes. Each link has road width information, such as the number of lanes, or tunnel information that identifies whether a road is that in a tunnel. Each node has height information in the Z-axis direction or the tunnel information that identifies a forefront position, a halfway position, a terminal position, or the like of the tunnel.

In the road network data 311 of FIG. 3, the link (for example, a link 321) indicated by the solid line is the road data drawn on the ground object 301, and a link 322 indicated by the dotted line is the road data in the tunnel that has the tunnel information mentioned above. One node 331 of the link 322 has the height information in the Z-axis direction and the tunnel information that identifies that it is an opening on one end of the tunnel. Similarly, the other node 332 of the link 322 has the height information in the Z-axis direction and the tunnel information that identifies that it is the opening on the other end of the tunnel.

Specifically, the map information database 201 achieves the functions with the recording medium, such as the ROM 102, the RAM 103, the HD 105, and the CD/DVD 107 illustrated in FIG. 1, for example. Additionally, in FIG. 2, the storage unit 202 stores color information (color data) and the depth information (Z value) of the image drawn by the drawing unit 206 for every pixel. Specifically, the storage unit 202 achieves the functions with the graphics memory 119 illustrated in FIG. 1, for example.

Moreover, the input unit 203 shown in FIG. 2 inputs the arbitrary view point coordinates in the 3D coordinate system mentioned above. Specifically, a user inputs the view point coordinates using the remote controller 112 or the input key 113 illustrated in FIG. 1. Current position information can be acquired using the GPS receiver 115, the angular velocity sensor 116, the travel distance sensor 117, and the tilt sensor 118 illustrated in FIG. 1, to obtain the view point coordinates from the acquired current position information.

The extracting unit 204 extracts, based on the view point coordinates input by the input unit 203, the map information that is present in a field of view from the view point coordinates from the map information database 201. Specifically a view frustum representing the field of view from the view point coordinates is set to extract the object contained in a coordinate position of the view frustum.

The generating unit 205 generates various objects based on the map information extracted by the extracting unit 204. Specifically, when the link or the node having the tunnel information is extracted by the extracting unit 204, for example, a cylindrical object corresponding to the length and width of the link is generated. Additionally, a fore-end face object that covers the fore-end opening of the cylindrical object or a rear end opening object that covers the rear end opening thereof is generated. The object generated by the generating unit 205 will be explained.

Figure 4:
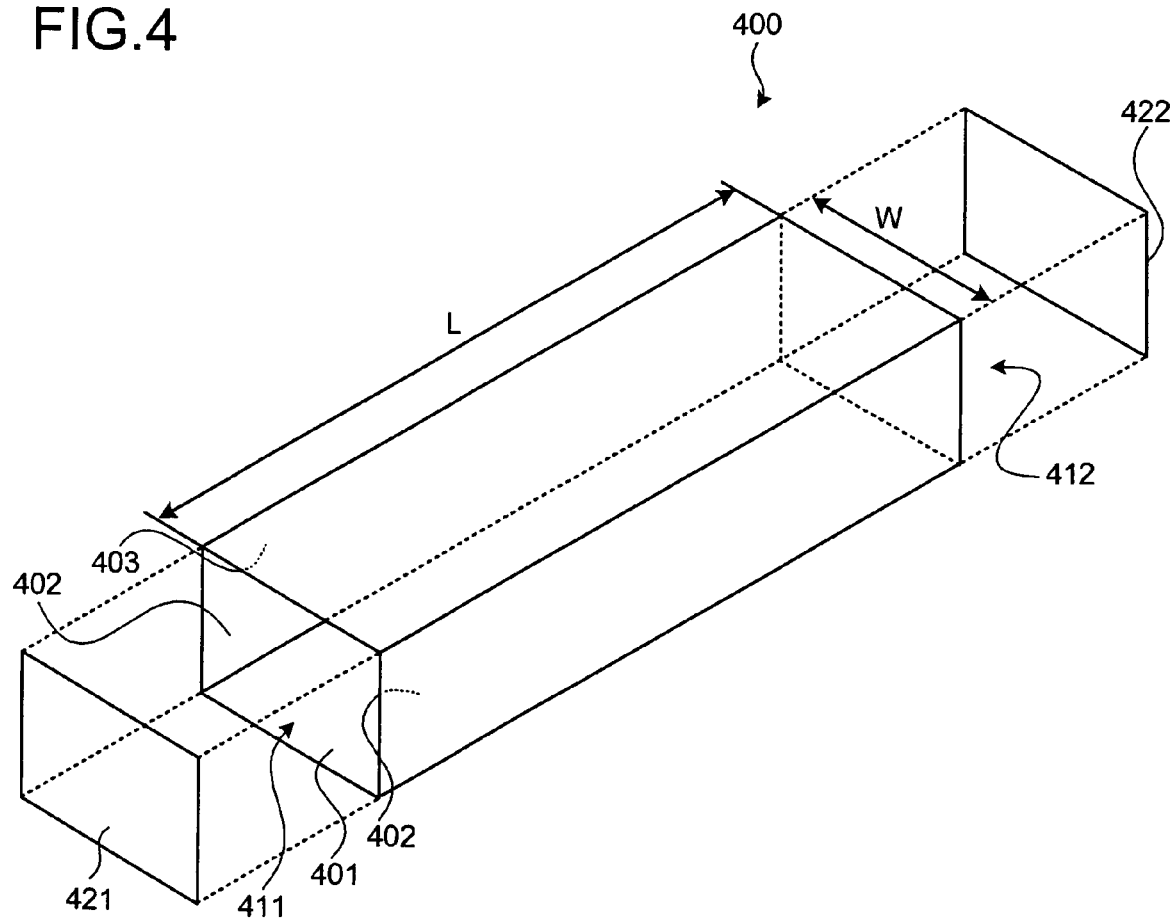
FIG. 4 is a perspective view of an object generated by a generating unit.

FIG. 4 is a perspective view of the object generated by the generating unit 205. In FIG. 4, longitudinal length L of a cylindrical object 400 is equivalent to the length of the tunnel to be generated, i.e., the length of the link 322 corresponding to the road data in the tunnel illustrated in FIG. 3. Width W of the cylindrical object 400 is equivalent to the above-mentioned road width information that the link 322 holds corresponding to the road data in the tunnel.

On a bottom surface 401 inside the cylindrical object 400, a texture of the road is drawn. On a side wall surface 402 and a ceiling surface 403, the texture representing the side wall and the ceiling surface in the actual tunnel is drawn. A fore-end opening 411 of the cylindrical object 400 corresponds to an entrance of the tunnel. On the fore-end opening 411, a fore-end face object 421 in the shape of cover that covers the fore-end opening 411 is generated. The fore-end face object 421 is the object of only shape, i.e., colorless (transparent).

A rear end opening 412 of the cylindrical object 400 corresponds to an outlet of the tunnel. On the rear end opening 412, a rear end face object 422 in the shape of cover that covers the rear end opening 412 is generated. The rear end face object 422 is colored when the other object viewed from the outlet of the tunnel is drawn, or it is set to be colorless when the separate object is drawn.

Moreover, as shown in FIG. 2, the drawing unit 206 includes first to fourth drawing units 211 to 214. The first drawing unit 211 draws the image of one object viewed from the view point coordinates input by the input unit 203. If the one object is the cylindrical object 400 generated by the generating unit 205, for example, the image can be drawn where the opening 411 and inner peripheral wall surfaces 401 to 403 of the cylindrical object 400 are viewed. More specifically, by recording the color data of the image in the frame buffer illustrated in FIG. 1, the image is drawn where the opening and the inner peripheral wall surfaces 401 through 403 of the cylindrical object 400.

The second drawing unit 212 draws, based on the depth information modified by the modifying unit 207 that will be explained later, the image of the other object when the other object other than the one object is viewed from the view point coordinates so as to overlap with the image of the one object. Specifically, if the one object is the cylindrical object 400 and the other object is the ground object 301 extracted from the map information database 201, the image of the cylindrical object 400 viewed from the view point coordinates and the image of the ground object 301 viewed from the view point coordinates are drawn so as to overlap with each other.

As for the image of the overlapping portion, the depth information modified by the modifying unit 207 is used for the image of the cylindrical object 400. Moreover, as for the image of the ground object 301, distance information from the view point coordinates to the coordinate position in the 3D coordinate system of the ground object is used. More specifically, by comparing the Z value as the depth information of the image of the cylindrical object 400 recorded in the Z-buffer illustrated in FIG. 1 and the Z value as the depth information of the drawn image of the ground object 301 viewed from the view point coordinates, the drawn image of the overlapping portion can be selected.

The third drawing unit 213 draws the image of a transparent object of a transparent color that is present in the position closer to the view point coordinates than the one object. Specifically, if the one object is the cylindrical object 400 and the transparent object is the transparent (colorless) fore-end face object 421 that covers the fore-end opening 411 of the cylindrical object 400, after the image of the cylindrical object 400 is drawn and before the ground object 301 as the other object is drawn, the image of the fore-end face object 421 is drawn. More specifically, since the image information of the fore-end face object 421 does not contain the color information but only the Z value as the depth information, in the overlapping portion of the image of the cylindrical object 400 and the image of the fore-end face object 421, the drawing state of the image of the cylindrical object 400 is maintained and only the Z value is rewritten.

The fourth drawing unit 214 draws the image of the object that is positioned behind the one object and the other object when viewed from the view point coordinates. Specifically, if the one object is the cylindrical object 400 and the other object is the ground object 301, the image of the other ground object positioned behind them is drawn. After drawing by the fourth drawing unit 214, the drawn image can be made into the depth information of infinite distance by clearing the Z value of the drawn image.

Furthermore, the modifying unit 207 modifies the depth information of the image of the one object drawn by the first drawing unit 211 into the information related to the distance from the position closer to the view point coordinates than the one object to the view point coordinates. Specifically, if the one object is the cylindrical object 400, the depth information of the image of the cylindrical object 400 is modified into the depth information in the position between the view point coordinates and the fore-end opening of the cylindrical object 400, for example. More specifically, the modifying unit 207 modifies the depth information of the image of the cylindrical object 400 into the depth information of the image of the transparent object.

Moreover, the detecting unit 208 detects whether the view point coordinates are the coordinates inside the cylindrical object 400, i.e., inside the tunnel. Specifically, the detection is performed using the XY coordinate value of the view point coordinates, the XY coordinate value of the link 322 equivalent to the tunnel, or the like, as well as the height information of the nodes 331 and 332. For example, if the XY coordinate value of the view point coordinates is identical to the XY coordinate value of the link 322 and the Z coordinate value of the view point coordinates is smaller than the height information of the nodes 331 and 332 that connect the link 322, it can be detected that the view point coordinates are the coordinates inside the tunnel. Since the XY coordinate value of the link spreads by the width information of the link, the view point coordinates can also be detected as the coordinates inside the tunnel when they correspond to the XY coordinate value in the spread range.

Note that the input unit 203, the extracting unit 204, the generating unit 205, the drawing unit 206, the modifying unit 207, and detecting unit 208 described above achieve their functions specifically by causing the CPU 101 or the graphics processor 130 to execute the program recorded on the recording medium such as the ROM 102, the RAM 103, the HD 105, or the CD/DVD 107 shown in FIG. 1, or by the input I/F 111, for example.

First Embodiment

Figure 5:
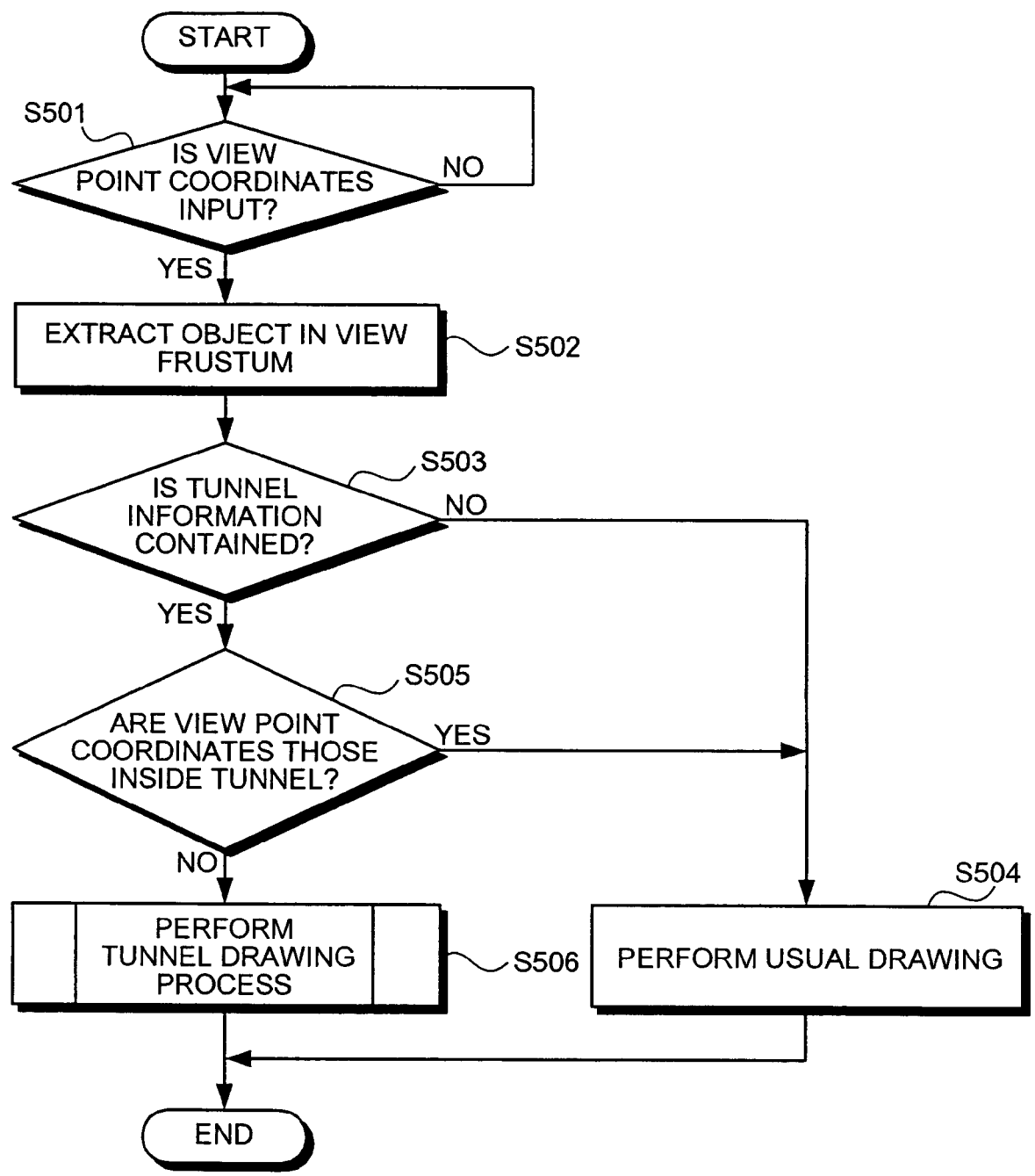
FIG. 5 is a flowchart of drawing procedure according to a first embodiment.

Next, drawing procedure according to a first embodiment will be explained. FIG. 5 is a flowchart of the drawing procedure according to the first embodiment. As shown in FIG. 5, when the view point coordinates are first input (step S501: YES), the map information that is present in the view frustum representing the field of view from the view point coordinates, i.e., the ground object 301 and the road network data 311, is extracted from the map information database 201 (step S502).

Next, it is detected whether the tunnel information is contained in the road network data 311 in the view frustum (step S503). When the tunnel information is not contained (step S503: NO), usual drawing process is performed (step S504). Specifically, quasi-3D drawing is carried out by drawing the images of the respective objects viewed from the view point coordinates and comparing the Z values of the images of the respective objects using the hidden surface removal method such as the Z-buffer method.

Meanwhile, when the tunnel information is contained (step S503: YES), it is detected whether the view point coordinates are the coordinates inside the tunnel (step S505). Subsequently, when it is detected that the view point coordinates are the coordinates inside the tunnel (step S505: YES), the procedure proceeds to step S504. In contrast, when it is determined that the view point coordinates are not the coordinates inside the tunnel (step S505: NO), tunnel drawing process is performed (step S506). The specific procedure of the tunnel drawing process (step S506) will be explained.

Figure 6:
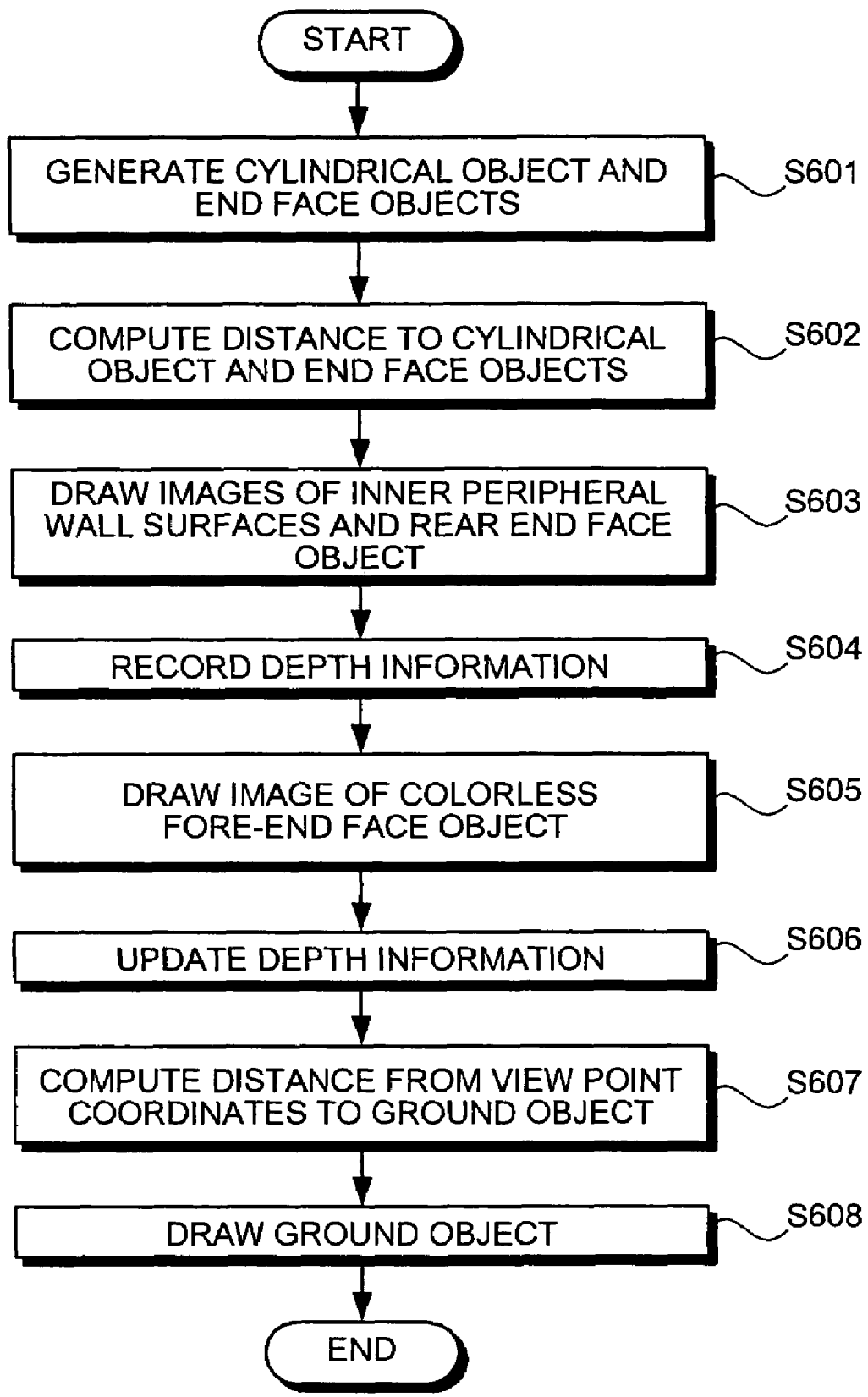
FIG. 6 is a flowchart of specific procedure of tunnel drawing process according to the first embodiment.
Figure 7:
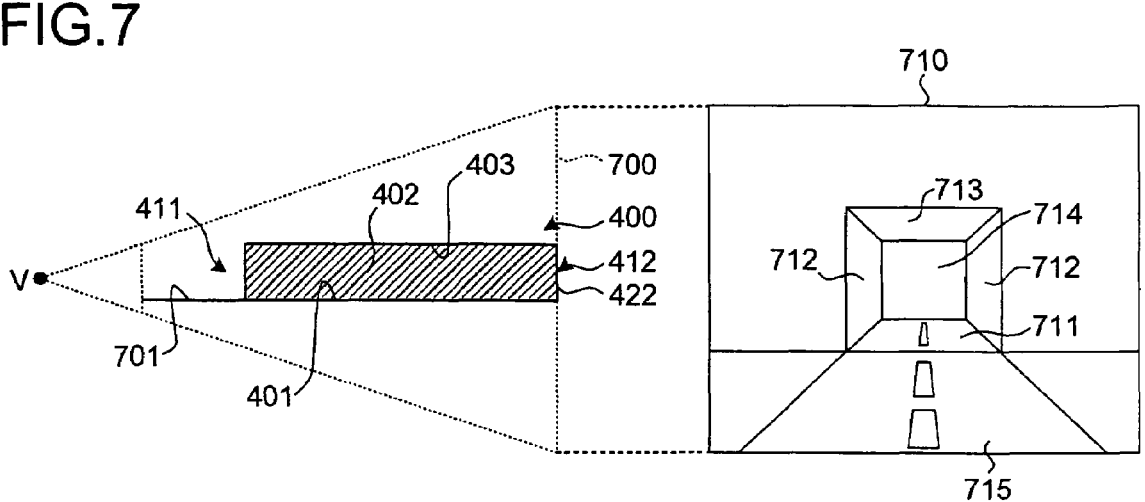
FIG. 7 is an explanatory diagram (part 1) illustrating content of drawing in the tunnel drawing process.
Figure 8:
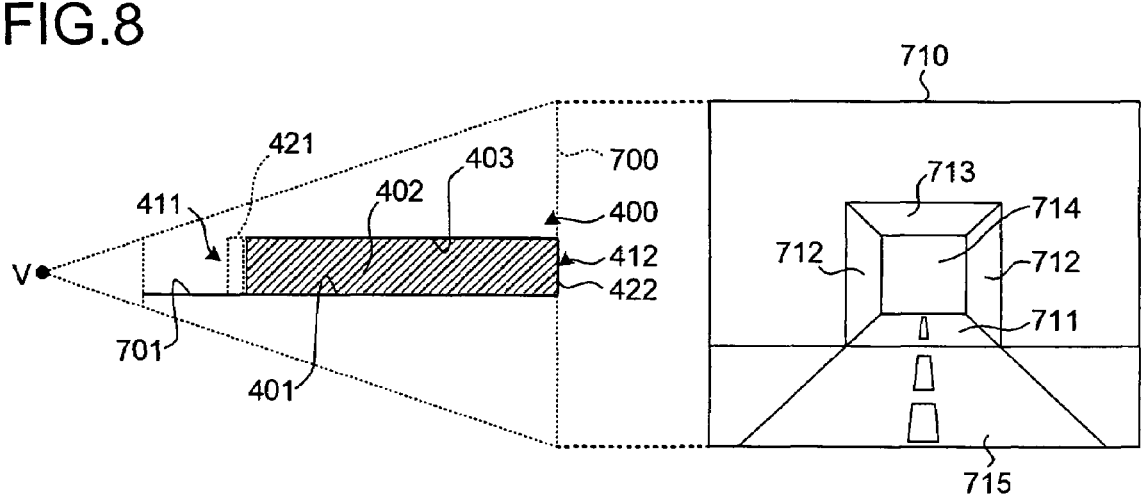
FIG. 8 is an explanatory diagram (part 2) illustrating content of drawing in the tunnel drawing process.
Figure 9:
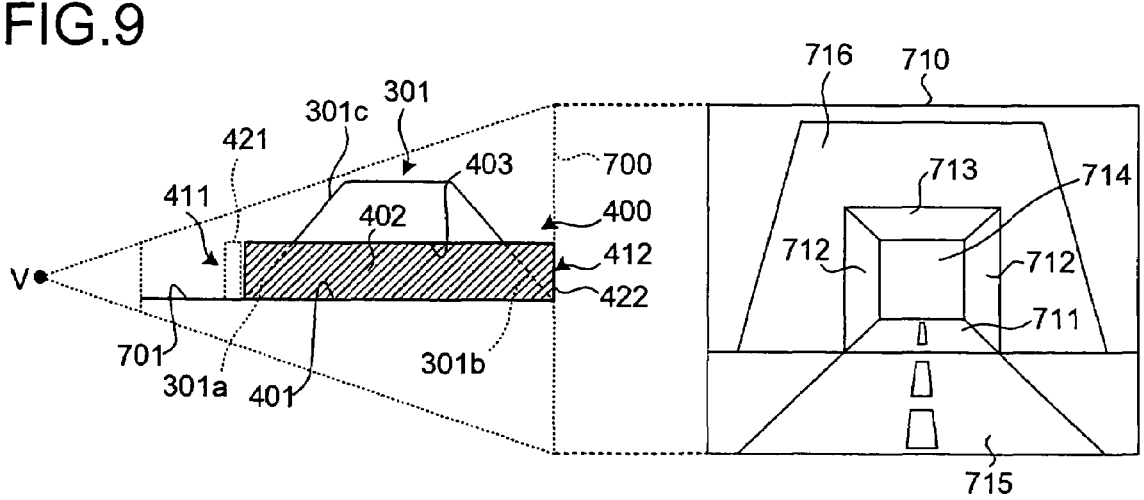
FIG. 9 is an explanatory diagram (part 3) illustrating content of drawing in the tunnel drawing process.

FIG. 6 is a flowchart of the specific procedure of the tunnel drawing process. The tunnel drawing procedure is the procedure when not drawing the object viewed from the outlet of the tunnel. FIGS. 7 through 9 are diagrams illustrating contents of drawing in the tunnel drawing process.

First, the cylindrical object 400 of which the inner peripheral wall surfaces 401 through 403 are viewed from the view point coordinates, the fore-end face object 421, and the rear end face object 422 are generated (step S601). The fore-end face object 421 is colorless while the rear end face object 422 is colored, for example, it is black.

Next, the distance from the view point coordinates to the cylindrical object 400, the distance from the view point coordinates to the fore-end face object 421, and the distance from the view point coordinates to the rear end face object 422 are computed (step S602). Subsequently, the cylindrical object 400 viewed from the view point coordinates, i.e., the images of the inner peripheral wall surfaces 401 through 403 and the image of the rear end face object 422 are drawn (step S603). Specifically, the color data of the images of the inner peripheral wall surfaces 401 through 403 and the image of the rear end face object 422 is recorded in the frame buffer 120 illustrated in FIG. 1.

Moreover, the drawing range of this step S603 will be explained. FIG. 7 is an explanatory diagram illustrating content of drawing at step S603. As shown in FIG. 7, the cylindrical object 400 constituted by the bottom surface 401, the side wall surface 402, and the ceiling surface 403 is present in a view frustum 700 representing the field of view viewed from the view point coordinates V. Additionally, the rear end face object 422 is positioned at the rear end opening 412 of the cylindrical object 400. Moreover, a road object 701 is formed in front of the fore-end opening 411.

The drawn image in this stage is illustrated as reference numeral 710 in the drawing. The drawn image 710 contains a drawn image 711 of the bottom surface 401, a drawn image 712 of the side wall surface 402, a drawn image 713 of the ceiling surface 403 (hereinafter, "inner peripheral wall surface images 711 through 713"), a drawn image 714 of the rear end face object 422 (hereinafter, "rear end face image"), and a drawn image 715 of the road object 701.

Along with the drawing of the inner peripheral wall surface images 711 through 713 and the rear end face image 714, the depth information of the inner peripheral wall surface images 711 through 713 and of the rear end face image 714 is recorded (step S604). Specifically, the values corresponding to the distance from the view point coordinates V to each point of the cylindrical object 400 computed at step S602 are recorded in the Z-buffer 121 for every pixel of the inner peripheral wall surface images 711 through 713. The values corresponding to the distance from the view point coordinates V to the rear end face object 422 are also recorded in the Z-buffer 121 for every rear end face image 714.

Next, the image of the colorless fore-end face object 421 is drawn (step S605). Specifically, since the fore-end face object 421 is colorless, the value in the frame buffer 120 is not modified and the inner peripheral wall surface images 711 through 713 and the rear end face image 714 remain drawn. The content of drawing in this step S605 will be explained. FIG. 8 is an explanatory diagram illustrating the content of drawing at step S605.

As shown in FIG. 8, the fore-end face object 421 is arranged at the fore-end opening 411 of the cylindrical object 400. Since the fore-end face object 421 is colorless, the value in the frame buffer 120 of the inner peripheral wall surface images 711 through 713 and the rear end face image 714 that overlap with the drawing range of the fore-end face object 421 is not updated, and the inner peripheral wall surface images 711 through 713 and the rear end face image 714 remain drawn. Meanwhile, by the drawing at step S605, the depth information (Z value) of the inner peripheral wall surface images 711 through 713 and the rear end face image 714 is updated from the value recorded at step S604 to the value corresponding to the distance from the view point coordinates V to the fore-end face object 421 (step S606).

Next, the distance to the ground object 301 viewed from the view point coordinates V is computed (step S607). The image of the ground object 301 viewed from the view point coordinates V is then drawn (step S608). In the drawing, the Z value as the depth information updated at step S606 is compared with the value corresponding to the distance computed at step S607. The content of drawing in this step S605 will be explained. FIG. 9 is an explanatory diagram illustrating the content of drawing at step S608.

As shown in FIG. 9, the ground object 301 is arranged so as to overlap with the cylindrical object 400. Inside the cylindrical object 400, foot data 301a and 301b of the ground object 301 is arranged. Since the foot data 301a on the side of the fore-end opening 411 is positioned behind the fore-end face object 421 when viewed from the view point coordinates V, the hidden surface removal is carried out for the image of the foot data 301a on the side of the fore-end opening 411 viewed from the view point coordinates V by the Z value of the transparent drawn image of the fore-end face object 421.

Similarly, since the foot data 301b on the side of the rear end opening 412 is positioned behind the fore-end face object 421 when viewed from the view point coordinates V, the hidden surface removal is carried out for the image of the foot data 301b on the side of the fore-end opening 411 viewed from the view point coordinates V by the Z value of the transparent drawn image of the fore-end face object 421. Since the foot data 301b corresponds to the back face of the polygon of the ground object 301 when viewed from the view point coordinates V, it is not drawn by back-face culling processing, either. Meanwhile, the ground object 301c outside the cylindrical object 400 is drawn as a drawn image 716.

As described above, in the tunnel drawing process according to the first embodiment, by replacing the Z value of the internal images 711 through 714 of the cylindrical object 400 representing the tunnel with the Z value of the colorless fore-end face object 421, and then drawing the ground object 301 behind the fore-end face object 421, the hidden surface removal can be carried out for the image of the ground object (foot data 301a and 301b) that overlaps with the internal images 711 through 714 while maintaining the drawing state of the internal images 711 through 714 of the cylindrical object 400. Thereby, quasi-drawing of the tunnel can be carried out as if it is formed in the ground object 301, enabling to recognize intuitively that the actual scenery and the drawn image are identical.

Second Embodiment

Figure 10:
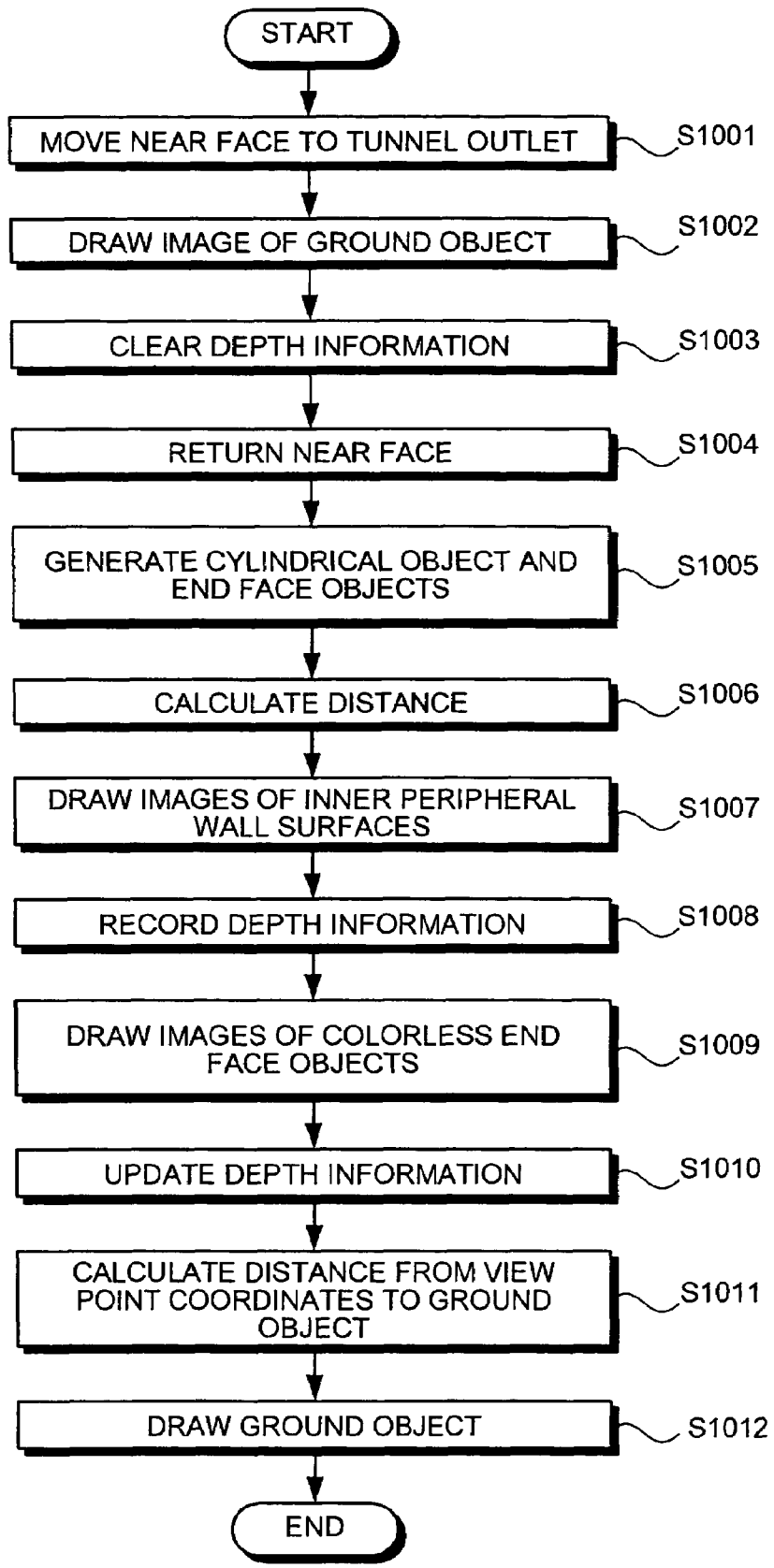
FIG. 10 is a flowchart of drawing procedure according to a second embodiment.

Next, the tunnel drawing procedure according to a second embodiment will be explained. FIG. 10 is a flowchart of the tunnel drawing procedure according to the second embodiment. The tunnel drawing procedure is the specific drawing process at step S506 shown in FIG. 5. FIGS. 11 through 14 are explanatory diagrams illustrating the contents of drawing in the tunnel drawing process. Since the drawing procedure shown in FIG. 5 is also applied this second embodiment, the description thereof will be omitted.

Figure 11:
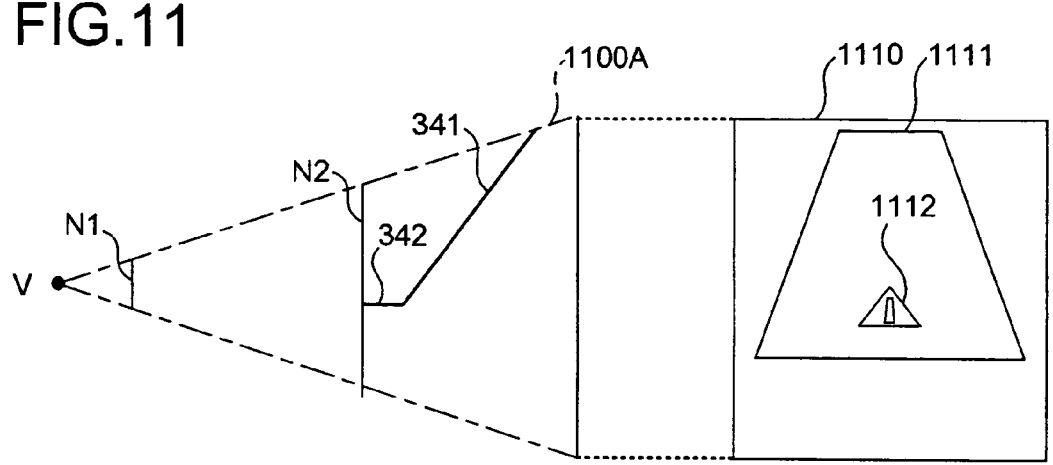
FIG. 11 is an explanatory diagram (part 1) illustrating content of drawing in the tunnel drawing process.

First, as shown in FIG. 11, a near face N1 is moved to the outlet position of the tunnel while fixing the view point coordinates V (step S1001). The near face after movement is stated as a near face N2, and the image of the ground object 341 and the image of the road object 342 in a view frustum 1100A visible from the view point coordinates V are drawn (step S1002). The drawn image in this stage is illustrated as reference numeral 1100 in the drawing. The depth information of these drawn images 1111 and 1112 is cleared (step S1003). Thereby, it can be considered that the ground object 341 and the road object 342 are the objects positioned at infinite distance when viewed from the view point coordinates V.

Figure 12:
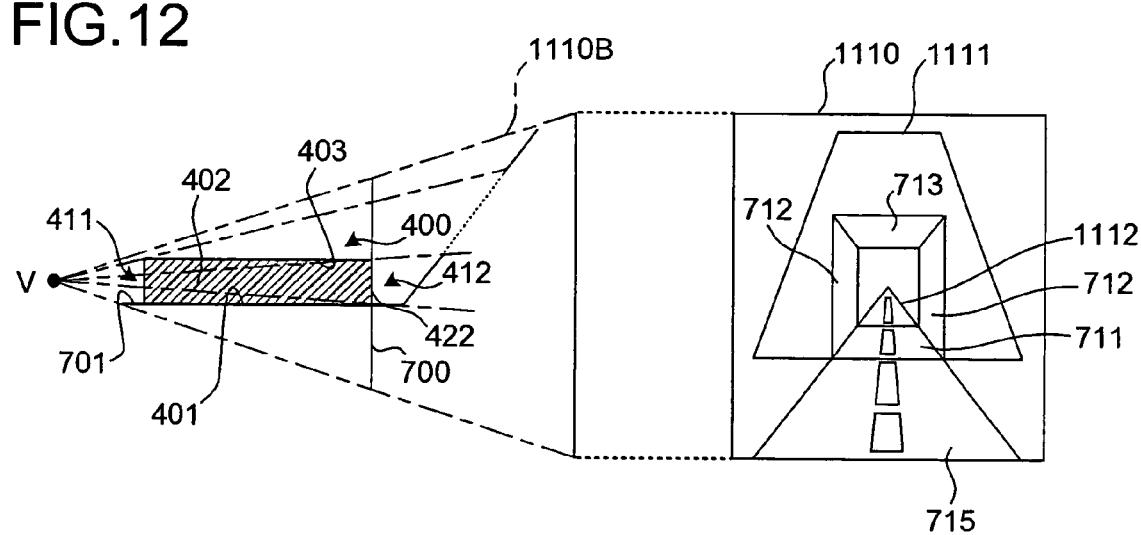
FIG. 12 is an explanatory diagram (part 2) illustrating content of drawing in the tunnel drawing process.

Next, as shown in FIG. 12, the near face N2 is returned to the original position and state it as the near face N1 (step S1004), and the cylindrical object 400, the colorless fore-end face object 421, and the colorless rear end face object 422, which are present in a view frustum 1100B representing the field of view from the view point coordinates V, are generated (step S1005). Subsequently, the distance from the view point coordinates V to the cylindrical object 400, the distance from the view point coordinates V to the fore-end face object 421, and the distance from the view point coordinates V to the rear end face object 422 are computed (step S1006). Thereafter, the image of the cylindrical object 400 viewed from the view point coordinates V, i.e., the inner peripheral wall surface images 711 through 713, are drawn (step S1007). Specifically, the color data of the inner peripheral wall surface images 711 through 713 is recorded in the frame buffer.

Furthermore, along with the drawing of the inner peripheral wall surface images 711 through 713, the depth information of the inner peripheral wall surface images 711 through 713 is recorded (step S1008). Specifically, the value corresponding to the distance from the view point coordinates V to each point of the cylindrical object 400 computed at step S1006 is recorded in the Z-buffer for every pixel of the inner peripheral wall surface images 711 through 713.

Figure 13:
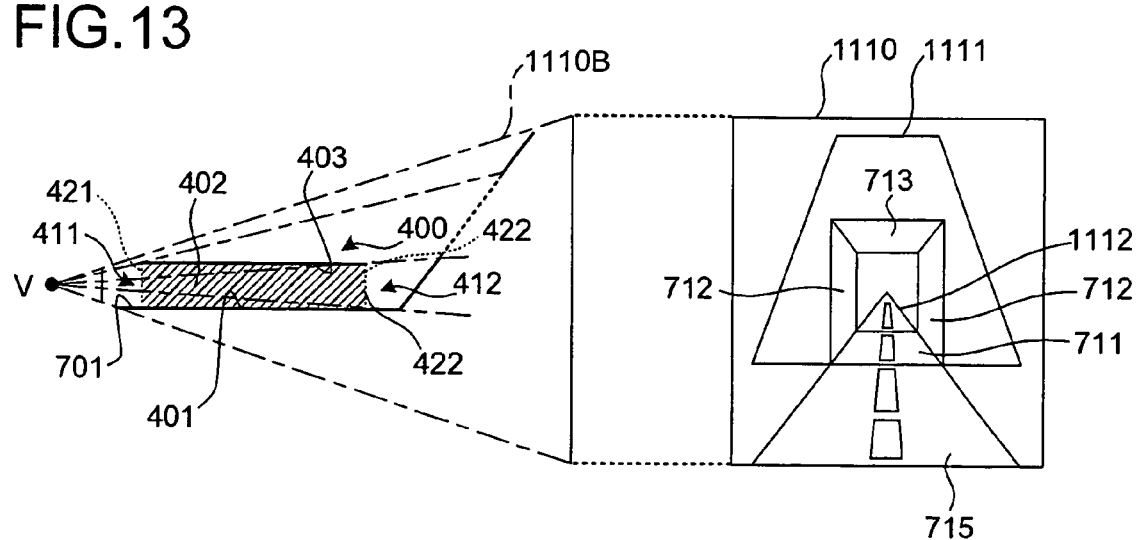
FIG. 13 is an explanatory diagram (part 3) illustrating content of drawing in the tunnel drawing process.

Next, as illustrated in FIG. 13, the image of the colorless fore-end face object 421 and the image of the colorless rear end face object 422 are drawn (step S1009). Specifically, since the fore-end face object 421 and the rear end face object 422 are colorless, the value in the frame buffer 120 is not modified and the inner peripheral wall surface images 711 through 713 remain drawn. Meanwhile, by the drawing, the depth information (Z value) is updated from the value recorded at step S1008 to the value corresponding to the distance from the view point coordinates V to the fore-end face object 421 (step S1010).

Figure 14:
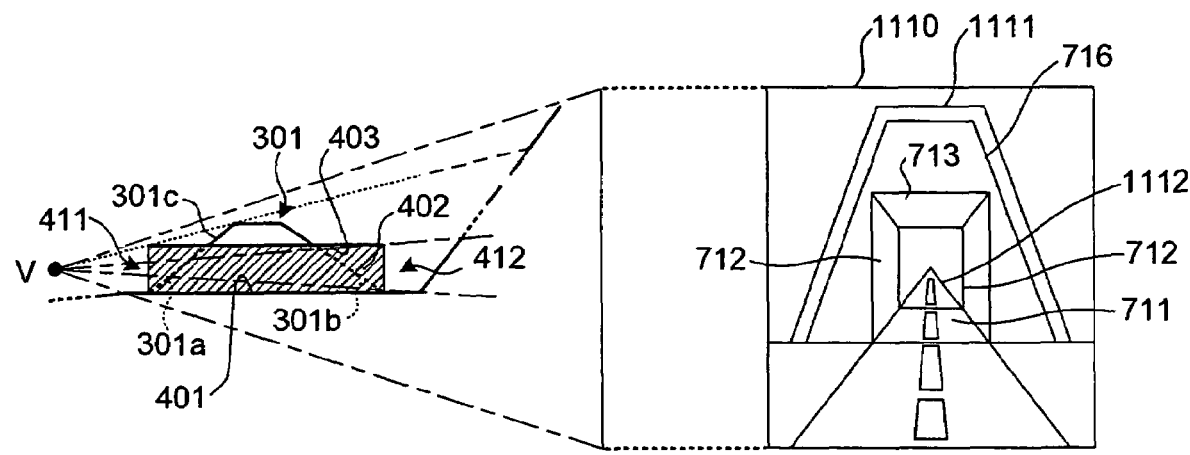
FIG. 14 is an explanatory diagram (part 4) illustrating content of drawing in the tunnel drawing process.

Next, the distance from the view point coordinates V to the ground object 301 is computed (step S1011). As illustrated in FIG. 14, the image 716 of the ground object 301 is then drawn (step S1012). In the drawing, the Z value as the depth information updated at step S1010 is compared with the value corresponding to the distance computed at step S1011.

As shown in FIG. 14, the ground object 301 is arranged so as to overlap with the cylindrical object 400. Inside the cylindrical object 400, the foot data 301a and 301b of the ground object 301 is arranged. Since the foot data 301a on the side of the fore-end opening 411 is positioned behind the fore-end face object 421 when viewed from the view point coordinates V, the hidden surface removal is carried out for the image of the foot data 301a on the side of the fore-end opening 411 viewed from the view point coordinates V by the Z value of the transparent drawn image of the fore-end face object 421.

Similarly, since the foot data 301b on the side of the rear end opening 412 is positioned behind the fore-end face object 421 when viewed from the view point coordinates V, the hidden surface removal is carried out for the image of the foot data 301b on the side of the fore-end opening 411 viewed from the view point coordinates V, by the Z value of the transparent drawn image of the fore-end face object 421. Since the foot data 301b corresponds to the back face of the polygon of the ground object 301 when viewed from the view point coordinates V, it is not drawn by the back-face culling processing, either. Meanwhile, the ground object 301c outside the cylindrical object 400 is drawn as the drawn image 716.

As described above, in the tunnel drawing process according to the second embodiment, the images 1111 and 1112 of the ground object 341 behind the tunnel outlet and the road object 342 are drawn first, the Z value of the internal images 711 through 713 of the cylindrical object 400 is replaced by the Z value of the colorless fore-end face object 421, and then the ground object 301 behind the fore-end face object 421 is drawn.

Thus, the hidden surface removal can be carried out for the image of the ground object (foot data 301a and 301b) that overlaps with the internal images 711 through 713 of the cylindrical object 400, while maintaining the drawing state of the internal images 711 through 713 of the cylindrical object 400. Thereby, quasi-drawing of the tunnel can be carried out as if it is formed in the ground object 301, enabling to recognize intuitively that the actual scenery and the drawn image are identical. Particularly, since the images 1111 and 1112 of the ground object 341 behind the tunnel outlet and the road object 342 are also drawn, the more realistic drawn image can be obtained.

Figure 15:
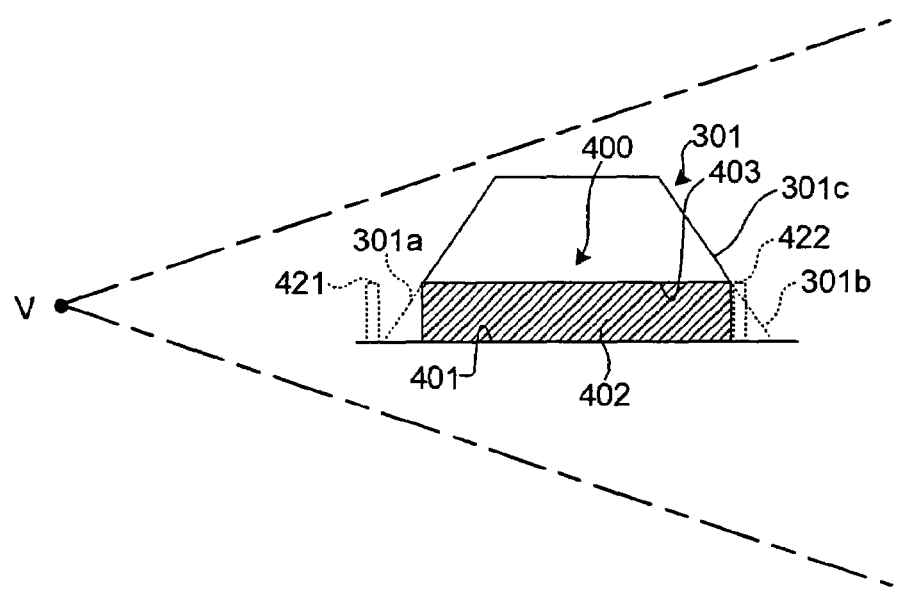
FIG. 15 is an explanatory diagram illustrating another example of content of drawing in the tunnel drawing process.

Although the foot data 301a and 301b of the ground object 301 is positioned inside the cylindrical object 400 in the first and second embodiments described above, it may be positioned in front of the fore-end opening 411 of the cylindrical object 400 when viewed from the view point coordinates V as illustrated in FIG. 15. In this case, the colorless fore-end face object 421 is formed in front of the foot data 301a when viewed from the view point coordinates V, and then the fore-end face object 421 is drawn before drawing the ground object 301. Thereby, the hidden surface removal can be carried out for the image of the foot data 301a in front of the fore-end opening 411 by the transparent image of the fore-end face object 421.

Similarly, the colorless rear end face object 422 is formed in front of the foot data 301b when viewed from the view point coordinates V, and then the rear end face object 422 is drawn before drawing the ground object 301. Thereby, the hidden surface removal can be carried out for the image of foot data 301b behind the rear end opening 412 by the transparent image of the rear end face object 422.

As described above, according to the drawing method, the drawing program, and the drawing apparatus 200 according to the embodiments of the present invention, the ground object in which the tunnel data is not formed is used, so that computation amount can be reduced and the drawing of realistic images resembling the viewed scenery can be achieved by the simple and high speed processing.

Note that the drawing method described in the embodiments can be realized by executing the program prepared preliminarily by a computer, such as a personal computer or a workstation. The program is recorded on the computer-readable recording medium, such as a hard disk, a flexible disk, a CD-ROM, an MO, and a DVD, and is executed by being read out from the recording medium by the computer. Moreover, the program may be a transmission medium, which can be distributed via a network, such as the Internet.

The invention claimed is:

1. A drawing method comprising:
inputting arbitrary view point coordinates in a three-dimensional coordinate system;
drawing a first image of an object generated based on road network data that uses a two-dimensional coordinate system, the first image illustrating the object viewed from the view point coordinates;
modifying depth information of the first image to information on distance from a position closer to the view point coordinates than a position of the object;
drawing, based on modified depth information, a second image of a ground object so as to overlap with the first image, the second image illustrating the ground object viewed from the view point coordinates, the ground object expressed using the three-dimensional coordinate system, and
drawing a third image of a transparent object that is present at a position closer to the view point coordinates than the position of the object, wherein the modifying includes modifying the depth information to depth information of the third image.

2. The drawing method according to claim 1, wherein the drawing the second image includes drawing the second image such that a portion of the second image that overlaps with the third image is not drawn, if the ground object is positioned behind the transparent object with respect to the view point coordinates.

3. The drawing method according to claim 1, wherein the object is an object having a cylindrical shape of which a fore-end opening at a fore end of the cylindrical shape and an inner peripheral wall surface are viewed when the object is viewed from the view point coordinates, the fore end being one of ends of the cylindrical shape positioned closer to the view point coordinates.

4. The drawing method according to claim 3, further comprising drawing a fourth image of another object positioned behind the object and the ground object with respect to the view point coordinates, wherein
the object has a rear-end opening at another one of the ends of the cylindrical shape, the rear-end opening viewed when the object is viewed from the view point coordinates, and
the drawing the first image includes drawing the first image so as to overlap with the fourth image.

5. The drawing method according to claim 3, further comprising detecting whether the view point coordinates correspond to a position inside the cylindrical shape of the object, wherein
the drawing the first image includes drawing the first image based on a result of detection at the detecting.

6. A computer-readable recording medium that stores therein a computer program making a computer execute:
inputting arbitrary view point coordinates in a three-dimensional coordinate system;

drawing a first image of an object generated based on road network data that uses a two-dimensional coordinate system, the first image illustrating the object viewed from the view point coordinates;

modifying depth information of the first image to information on distance from a position closer to the view point coordinates than a position of the object;

drawing, based on modified depth information, a second image of a ground object so as to overlap with the first image, the second image illustrating the ground object viewed from the view point coordinates, the ground object expressed using the three-dimensional coordinate system, and drawing a third image of a transparent object that is present at a position closer to the view point coordinates than the position of the object, and the modifying includes modifying the depth information to depth information of the third image.

7. The computer-readable recording medium according to claim 6, wherein the drawing the second image includes drawing the second image such that a portion of the second image that overlaps with the third image is not drawn, if the ground object is positioned behind the transparent object with respect to the view point coordinates.

8. The computer-readable recording medium according to claim 6, wherein the object is an object having a cylindrical shape of which a fore-end opening at a fore end of the cylindrical shape and an inner peripheral wall surface are viewed when the object is viewed from the view point coordinates, the fore end being one of ends of the cylindrical shape positioned closer to the view point coordinates.

9. The computer-readable recording medium according to claim 8, wherein the computer program further makes the computer execute drawing a fourth image of another object positioned behind the object and the ground object with respect to the view point coordinates, the object has a rear-end opening at another one of the ends of the cylindrical shape, the rear-end opening viewed when the object is viewed from the view point coordinates, and the drawing the first image includes drawing the first image so as to overlap with the fourth image.

10. The computer-readable recording medium according to claim 8, wherein the computer program further makes the computer execute detecting whether the view point coordinates correspond to a position inside the cylindrical shape of the object, and the drawing the first image includes drawing the first image based on a result of detection at the detecting.

11. A drawing apparatus comprising:

an input unit configured to input arbitrary view point coordinates in a three-dimensional coordinate system;

a first drawing unit configured to draw a first image of an object generated based on road network data that uses a two-dimensional coordinate system, the first image illustrating the object viewed from the view point coordinates;

a modifying unit configured to modify depth information of the first image to information on distance from a position closer to the view point coordinates than a position of the object;

a second drawing unit configured to draw, based on modified depth information, a second image of a ground object so as to overlap with the first image, the second image illustrating the ground object viewed from the view point coordinates, the ground object expressed using the three-dimensional coordinate system, and a third drawing unit configured to draw a third image of a transparent object that is present at a position closer to the view point coordinates than the position of the object, wherein the modifying unit is configured to modify the depth information to depth information of the third image.

12. The drawing apparatus according to claim 11, wherein the second drawing unit is configured not to draw a portion of the second image that overlaps with the third image, if the ground object is positioned behind the transparent object with respect to the view point coordinates.

13. The drawing apparatus according to claim 11, wherein the object is an object having a cylindrical shape of which a fore-end opening at a fore end of the cylindrical shape and an inner peripheral wall surface are viewed when the object is viewed from the view point coordinates, the fore end being one of ends of the cylindrical shape positioned closer to the view point coordinates.

14. The drawing apparatus according to claim 13, further comprising a fourth drawing unit configured to draw a fourth image of another object positioned behind the object and the ground object with respect to the view point coordinates, wherein the object has a rear-end opening at another one of the ends of the cylindrical shape, the rear-end opening viewed when the object is viewed from the view point coordinates, and the first drawing unit is configured to draw the first image so as to overlap with the fourth image.

15. The drawing apparatus according to claim 13 further comprising a detecting unit configured to detect whether the view point coordinates correspond to a position inside the cylindrical shape of the object, wherein the first drawing unit is configured to draw the first image based on a result of detection by the detecting unit.

* * * * *